United States Patent Office 2,770,604
Patented Nov. 13, 1956

2,770,604

RUBBER PLASTICIZED WITH ZINC SALTS OF NUCLEAR CHLORINATED AROMATIC MERCAPTANS

Arthur A. Baum, Wilmington, Del., assignor to E. I. du Pont de Nemours and Company, Wilmington, Del., a corporation of Delaware No Drawing. Application April 9, 1952,
Serial No. 281,477

9 Claims. (Cl. 260—30.8)

This invention relates to processing elastomeric materials, and more particularly to agents which may be milled with an elastomer for improving its plasticity and working properties.

Heretofore, a large variety of thio-compounds have been added to raw elastomers when they are processed to improve their plasticity and other properties; however, these agents have certain disadvantages, such as their toxicity, unpleasant odor, or effect on the skin. These disadvantages have been avoided to a large extent by milling the elastomers in closed equipment and protecting the workers by providing good ventillation and protective clothing. It will be apparent, however, that a plasticizer which does not require such precautions would be highly desirable.

It is, therefore, an object of this invention to provide a plasticizing agent which does not have an unpleasant odor for use in compounding rubber, both natural and synthetic. Another object is the provision of a rubber plasticizing agent which is non-toxic and does not produce dermatitis. A still further object is the provision of a plasticizing agent which is effective in small amounts and is not prohibitive economically or technically. Other objects will appear as the description of the invention proceeds.

These objects are accomplished by incorporating into an elastomer as it is milled, from 0.05% to 5.0% by weight, based on the weight of the rubber, of a zinc salt of a chlorinated aromatic mercaptan of the benzene and naphthalene series containing at least three chlorine atoms on the aromatic nucleus.

The elastomers which may be plasticized by the present invention include those commonly included by this term, such as all types of natural rubber, butadiene polymers, and copolymers of butadiene with other polymerizable substances such as styrene and acrylonitrile.

The chlorinated mercaptans used as the zinc salts in the present invention preferably contain from 6 to 12 carbon atoms and from 3 to 5 nuclear chlorines. Examples of such zinc mercaptides are those of trichlorophenyl mercaptan, trichlorothiocresols, trichloroxylyl mercaptan, trichloro alpha and beta thionaphthols, pentachlorophenyl mercaptan, and tetrachlorophenyl mercaptan.

These chloromercaptans are conveniently made by introducing the mercaptan group in the corresponding polychlorohydrocarbon by treatment with sulfur chloride, followed by reduction. The invention is not dependent on this specific method, however.

The elastomers are plasticized by milling in any standard equipment such as a Gordon plasticator, Banbury mixer or conventional rubber mill. Temperatures between 100° C. and 200° C. are satisfactory. The plasticizing agent is added to the elastomer as it is being milled, preferably in the dry state. If desired, nickel salts of dithiocarbamates and of alkylxanthates may be used in small amounts with the zinc chloromercaptides.

The following example illustrates certain embodiments of the invention, but it is not restricted in scope to this example, since any of the elastomers and mercaptides mentioned above may be combined in similar manner.

*Example*

Forty grams of unbroken smoked sheet rubber was placed on a 6 inch laboratory mill and masticated for about 40 seconds, at which time the smoked sheet formed a continuous band. The agent to be tested was then added in the quantity indicated in the following table and mixed with the rubber at about 120° C. for the time indicated. The plasticized rubber so obtained was removed from the mill and plasticity pellets were cut. The plasticity and recovery were measured on a Williams Parallel Plate Plastometer (Williams, Ind. Eng. Chem., 16,362 (1924)). This test consists essentially of measuring the thickness in thousandths of an inch of a pellet after 3 minutes deformation at 80° C. under a load of 5000 grams. The thickness in these units is known as the plasticity number. The pellet used has a volume of 2 cc. and an original thickness of 0.4 inch. The recovery is measured at room temperature 1 minute after removing the weight from the pellet, and is the difference in thousandths of an inch between the recovered thickness of the pellet and the plasticity number.

Experiments were run for comparison without added agent and also with zinc xylyl mercaptide. No odor was evident in the experiments with either the trichloro- or pentachlorophenyl mercaptide at any stage of the operation. In the case of the xylyl mercaptide a strong mercaptan odor was present throughout. It was noted during the experiment that, although zinc xylyl mercaptide gave a strong odor of xylyl mercaptan, the zinc chloromercaptides of the present invention gave no odor, even through the corresponding free mercaptans have very powerful odors.

The table shows that the odorless zinc polychlorophenyl mercaptides are effective plasticizing agents and their plasticizing action is comparable with that of the bad-smelling xylyl mercaptide.

Similar plasticizing was obtained by milling zinc trichlorophenyl mercaptan with GR–S synthetic rubber (butadiene-styrene copolymer elastomer). It was found that 2% of this mercaptide milled with the rubber for 15 minutes at 110° C. gave a plasticity of 96 and a recovery of 1, while a control, run under the same conditions but without the mercaptide gave a plasticity of 137 and a recovery of 42.

| Agent | Time in minutes | Percent Used | Plasticity | Recovery |
|---|---|---|---|---|
| Zinc trichlorophenyl mercaptide. | 2.5 | 0.1 | 150 | 32 |
| | 5 | 0.2 | 121 | 11 |
| | 10 | 0.4 | 81 | 2 |
| | 20 | 0.05 | 133 | 22 |
| Zinc pentachlorophenyl mercaptide. | 5 | 0.2 | 135 | 21 |
| | 10 | 0.4 | 93 | 4 |
| | 20 | 0.1 | 109 | 10 |
| Zinc xylyl mercaptide | 2.5 | 0.1 | 137 | 20 |
| | 5 | 0.2 | 119 | 9 |
| | 10 | 0.4 | 104 | 8 |
| | 20 | 0.1 | 91 | 5 |
| None | 2.5 | | 211 | 93 |
| | 5 | | 198 | 78 |
| | 10 | | 184 | 66 |
| | 20 | | 160 | 33 |

It will be apparent that the present invention represents a decided advance in the art, and that the plasticizing agents herein disclosed are efficient plasticizers for natural and synthetic rubber, but lack the odor of the corresponding zinc salts of non-chlorinated mercaptans.

It will be apparent that many widely different embodiments of this invention may be made without departing

I claim:

1. The process of plasticizing a rubber which comprises milling the rubber and adding thereto from 0.05% to 5.0% by weight, based on the weight of the rubber, of a plasticizing agent consisting of the zinc salt of trichlorophenyl mercaptan as the sole essential ingredient.

2. A composition prepared by the process of claim 1.
3. A composition prepared by the process of claim 6.
4. A composition prepared by the process of claim 7.
5. A composition prepared by the process of claim 8.
6. The process of claim 1 in which the rubber is natural rubber.
7. The process of claim 1 in which the rubber is a butadiene polymer.
8. The process of claim 1 in which the rubber is a copolymer of butadiene and styrene.
9. The process of claim 1 in which the rubber is milled at a temperature between 100° C. and 200° C.

References Cited in the file of this patent

UNITED STATES PATENTS

| | | |
|---|---|---|
| 2,378,519 | Vincent | June 19, 1945 |
| 2,466,301 | Haworth et al. | Apr. 5, 1949 |
| 2,467,789 | Verbanc | Apr. 19, 1949 |
| 2,609,404 | Verbanc | Sept. 2, 1952 |
| 2,609,405 | Torrence | Sept. 2, 1952 |
| 2,695,898 | Lober et al. | Nov. 30, 1954 |